United States Patent [19]

Ogawa et al.

[11] Patent Number: 5,044,744

[45] Date of Patent: Sep. 3, 1991

[54] METHOD AND APPARATUS FOR DISTANCE MEASUREMENT USING ELECTROMAGNETIC WAVES

[75] Inventors: Ichizo Ogawa; Yoshihisa Warashina; Yoshihiko Mizushima; Koji Ichie; Morio Takeichi; Akira Takeshima, all of Shizuoka, Japan

[73] Assignee: Hamamatsu Photonics K. K., Shizuoka, Japan

[21] Appl. No.: 529,617

[22] Filed: May 29, 1990

[51] Int. Cl.$^5$ .............................................. G01C 3/08
[52] U.S. Cl. ...................................... 356/5; 342/127; 342/134
[58] Field of Search ...................... 356/5; 342/127, 134

[56] References Cited

U.S. PATENT DOCUMENTS

| | | | |
|---|---|---|---|
| 3,437,820 | 4/1969 | Thompson et al. | 356/5 |
| 3,619,057 | 11/1971 | Castellano et al. | 356/5 |
| 3,625,619 | 12/1971 | Scholdstrom | 356/5 |
| 4,229,102 | 10/1980 | Wiklund et al. | 356/5 |
| 4,355,894 | 10/1982 | Maeda | 356/5 |
| 4,537,502 | 8/1985 | Miller et al. | 356/5 |

OTHER PUBLICATIONS

James C. Owens "Optical Refractive Index of Air: Dependence on Pressure, Temperature and Composition", Jan. 1967, vol. 6, No. 1, pp. 51–59.
L. E. Slater, et al., "A Multiwavelength Distance-Measuring Instrument for Geophysical Experiments", Journal of Geophysical Research, Dec. 10, 1976, pp. 6299–6306.
Bengt Edlen, "The Refractive Index of Air", vol. 2, No. 2, 1966, pp. 71–80.
Naomi Fujita, "Multi-Wavelength Laser Distance Measuring Instrument", Survey, 1981, Oct., pp. 27–30.

Primary Examiner—Stephen C. Buczinski
Attorney, Agent, or Firm—Finnegan, Henderson, Farabow, Garrett and Dunner

[57] ABSTRACT

Times $t_1$ and $t_2$ required for two electromagnetic waves having different wavelengths to propagate from a reference point to a target point are measured. Necessary meteorological conditions along the path are also measured to determine refractivities $N_1$ and $N_2$ of the path for the two electromagnetic waves as:

$$N_1 = \alpha_1 \cdot \rho_s + \beta_1 \cdot \rho_w$$

$$N_2 = \alpha_2 \cdot \rho_s + \beta_2 \cdot \rho_w$$

where $\rho_s$ and $\rho_w$ are densities of dry air and water vapor in the path, respectively. Length of the path D is calculated using the following formula:

$$D = [t_1 + \{(\alpha_1 + \beta_1 \cdot \rho_w/\rho_s) \cdot (t_2 - t_1)\}/\{(\alpha_1 + \beta_1 \cdot \rho_w/\rho_s) - (\alpha_2 + \beta_2 \cdot \rho_w/\rho_s)\}] \cdot C$$

where C is the speed of an electromagnetic wave in vacuum.

3 Claims, 1 Drawing Sheet

METHOD AND APPARATUS FOR DISTANCE MEASUREMENT USING ELECTROMAGNETIC WAVES

BACKGROUND OF THE INVENTION

This invention relates to a method and apparatus for measuring the path length from a reference pint to a target pint using electromagnetic waves.

Various methods and apparatuses have conventionally been used to determine the length of an optical path by measuring the propagation time of light waves. Most of these conventional methods and apparatuses for optical distance measurement use light at a single wavelength. The principle is to measure the propagation time of light wave t, and meteorological conditions along the optical path, such as the temperature T, atmospheric pressure P and relative humidity Rh, then estimate the refractivity $N(T, P, RH, \ldots)$ of the optical path, and determined the optical path length D by the equation $D = \{t/(N+1)\} \cdot C$, where C is the speed of light in vacuum. Therefore, in order to achieve the correct distance measurement, it is essential to get correct information on meteorological conditions such as the temperature, pressure and humidity of the atmosphere along the path. Correct meteorological measurements can be made under strictly controlled environmental conditions such as in a laboratory or an underground tunnel or if the distance to be measured is short, so in such cases, even conventional methods will suffice since they insure optical distance measurements with a reasonable accuracy.

However, if one wants to measure a distance that extends through the atmosphere for several to several tens of kilometers in a horizontal direction as is often encountered in surveys, a serious problem will arise since it is not easy to estimate the average refractivity of the optical path. This causes an unavoidable difficulty in achieving distance measurement with high accuracy. Attempts have been made to perform precise distance measurements under such conditions by estimating the average refractivity along the optical path in a more accurate way base on the data acquired with many instruments for meteorological observations that are installed along the optical path. However, this method not only requires a large-scale system, but it also give s rise to additional problems such as one involved in calibrating various instruments for meteorological observations. The latter problems would prevent satisfactorily high precision of measurements.

On the other hand, it is known that the refractivity N of an optical path filled with n nonpolar materials can be expressed by the following equation:

$$N = \sum_{i=1}^{n} R_i \cdot \rho_i$$

where $\rho_i$ and $R_i$ are a density and a wavelength-dependent coefficient of the ith constituent material, respectively. On the basis of this relationship, it has been attempted to totally eliminate the need for meteorological observations by measuring propagation times of a plurality of light waves having different wavelengths through a given optical path.

In a dual-wavelength method, times $t_1$ and $t_2$ required for light waves having wavelengths $\lambda_1$ and $\lambda_2$ to propagate through an optical path of interest are measured, and determining the relationships:

$$N_1 = \alpha_1 \cdot \rho_s$$

delete when finished
$$N_1 = \alpha_1 \cdot \rho_s$$

$$N_2 = \alpha_2 \cdot \rho_s$$

(where $\rho_s$ is the density of dry air in the optical path, and $N_1$ and $N_2$ are refractivities at the wavelengths $\lambda_1$ and $\lambda_2$), the optical path length D is calculated as:

$$D = [t_1 + \alpha_1 \cdot (t_2 - t_1)/(\alpha_1 - \alpha_2)] \cdot C.$$

Since the density of water vapor int he optical path, namely the humidity, is not considered at all in this method, distance measurements with high precision can hardly be accomplished.

In a three-wavelength method, times $t_1$, $t_2$ and $t_3$ required for light waves having wavelengths $\lambda_1$, $\lambda_2$ and $\lambda_3$ to propagate through an optical path of interest are measured, and determining the relationships:

$$N_1 = \alpha_1 \cdot \rho_s + \beta_1 \cdot \rho_w$$

$$N_2 = \alpha_2 \cdot \rho_s + \beta_2 \cdot \rho_w$$

$$N_3 = \alpha_3 \cdot \rho_s + \beta_3 \cdot \rho_w$$

(where $\rho_s$ and $\rho_w$ are the density of dry air and the density of water vapor in the optical path, respectively, and $N_1$, $N_2$ and $N_3$ are refractivities at the wavelengths $\lambda_1$, $\lambda_2$ and $\lambda_3$), the optical path length D is calculated as:

$$D = [t_1 + \{(\alpha_1 \cdot \beta_2 - \alpha_3 \cdot \beta_1) \cdot (t_2 - t_1)\}/\{(\alpha_2 - \alpha_1) \cdot (\beta_3 - \beta_1) - (\alpha_3 - \alpha_1) \cdot (\beta_2 - \beta_1)\} + \{(\alpha_2 \cdot \beta_1 - \alpha_1 \cdot \beta_2) \cdot (t_3 - t_1)\}/\{(\alpha_2 - \alpha_1) \cdot (\beta_3 - \beta_1) - (\alpha_3 - \alpha_1) \cdot (\beta_2 - \beta_1)\}] \cdot C.$$

This is theoretically a very reliable method, but for its implementation, the development of new techniques concerned with a light source, a light transmission control apparatus, a light receiving and detecting apparatus, etc. is indispensable. It is difficult to realize an effective system by the state of the art.

SUMMARY OF THE INVENTION

An object of the present invention is to solve the aforementioned problems of the prior art.

Another object is to make it possible to readily perform a distance measurement of high accuracy even with lower accuracies of necessary meteorological measurements compared with the prior art method and apparatus.

In the present invention, the following relationships are determined by performing necessary meteorological measurements:

$$N_1 = \alpha_1 \cdot \rho_s + \beta_1 \cdot \rho_w$$

$$N_2 = \alpha_2 \cdot \rho_s + \beta_2 \cdot \rho_w$$

where $\rho_s$ and $\rho_w$ are the density of dry air and the density of water vapor in a path to be measured, and $N_1$ and $N_2$ are refractivities for electromagnetic waves having wavelengths $\lambda 1$ and $\lambda 2$. Paying attention to the fact that under ordinary meteorological conditions the following relationships hold:

$$\alpha_1 >> \beta_1 \cdot (\rho_w/\rho_s)$$

$$\alpha_2 >> \beta_2 \cdot (\rho_w/\rho_s),$$

the present invention uses the following formula to calculate the path length D:

$$D=[t_1+\{(\alpha_1+\beta_1\cdot\rho_w/\rho_s)\cdot(t_2-t_1)\}/\{(\alpha_1+\beta_1\cdot\rho_w/\rho_s)-(\alpha_2+\beta_2\cdot\rho_w/\rho_s)\}]\cdot C.$$

where C is the speed of an electromagnetic wave in vacuum.

DETAILED DESCRIPTION OF THE PREFERRED EMBODIMENT

Figure 1:
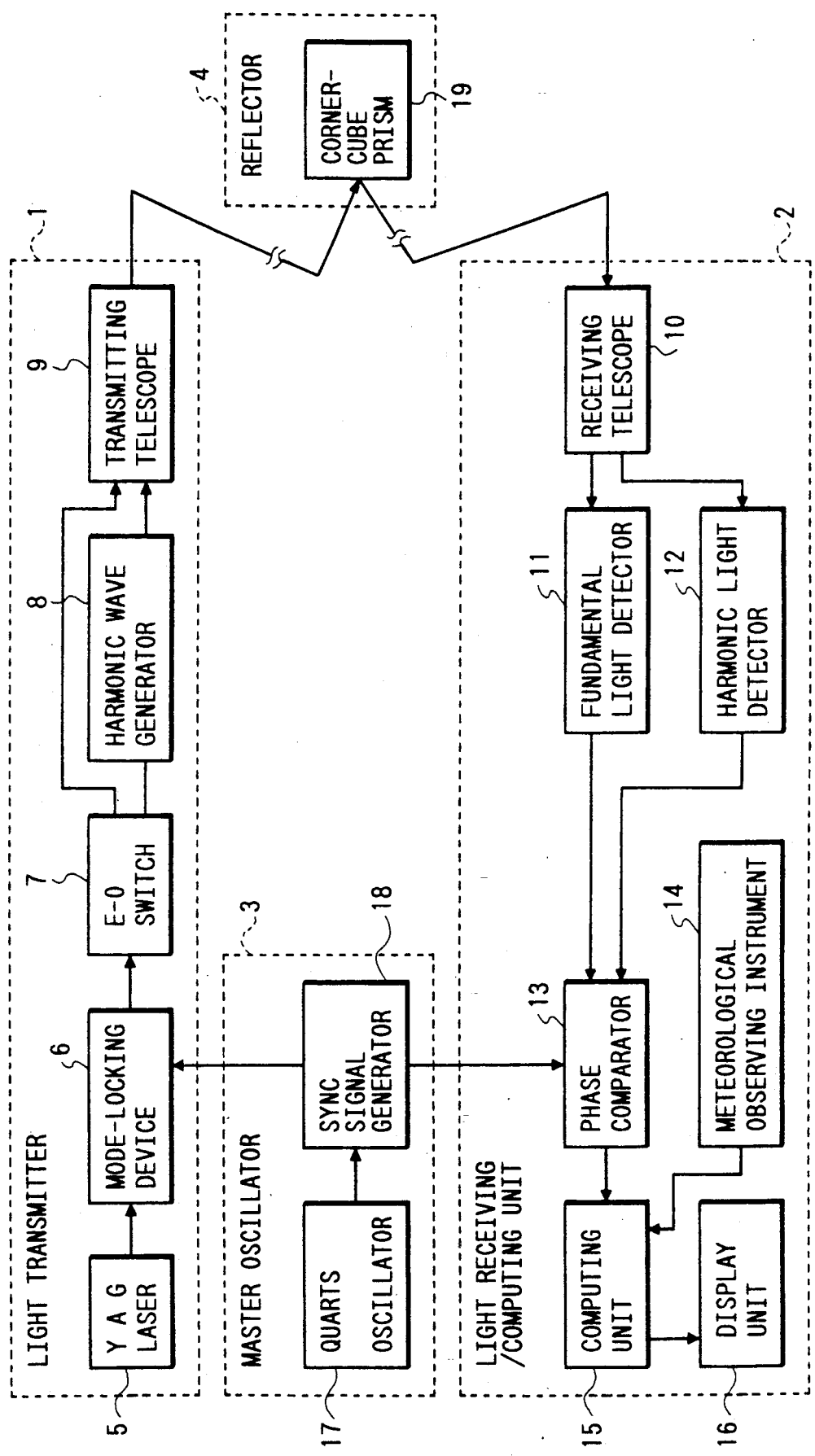
FIG. 1 is a block diagram showing the construction of an apparatus for measuring a path length according to an embodiment of the present invention.

An embodiment of the present invention is described hereinafter with reference to FIG. 1.

The apparatus shown in FIG. 1 comprises a light transmitter 1 for transmitting a light wave to a reflector 4 at the target point, a light receiving and computing unit 2 for receiving the light reflected from the reflector 4 and performing mathematical operations, data processing and display that are necessary for distance measurement, a master oscillator 3 for supplying a synchronizing signal to both the transmitter 1 and the light receiving/computing unit 2, and the reflector 4 by which the transmitted light wave is reflected toward the light receiving/computing unit 2. In the embodiment shown, the light transmitter 1, the light receiving-/computing 2 and the master oscillator 3 are installed at the reference point, whereas the reflector 4 is installed at the target point.

The light transmitter 1 is composed of a YAG laser 5 for emitting a fundamental light beam at a wavelength of 1064 nm, a mode-locking device 6 that converts the output light of the YAG laser 5 to a pulse train in response to a synchronizing signal generated from the master oscillator 3, an electrooptic switch 7 that produces a light pulse burst from the output pulse train from the mode-locking device 6, a harmonic wave generator 8 that receives the light pulse burst from the electrooptic switch 7 and produces a second harmonic wave, namely a light pulse burst at a wavelength of 532 nm, and a light-transmitting telescope 9 that mixes the output light pulse bursts from the electrooptic switch 7 and the harmonic wave generator 8 and sends the resulting mixed wave to the reflector 4 at the target point.

The light receiving/computing unit 2 comprises a light-receiving telescope 10 that receives the light pulse bursts reflected from the reflector 4 at the target point, a fundamental light detector 11 that detects the fundamental light pulse burst received by the telescope 10 and converts it to a demodulated electric signal, a harmonic light detector 12 that detects the harmonic light pulse burst received by the telescope 10 and converts it to another demodulated electric signal, a phase comparator 13 that compares phases of the demodulated electric signals produced by the fundamental light detector 11 and the harmonic light detector 12 with a phase of the synchronizing signal provided from the master oscillator 3, and a computing unit 15 which, on the basis of the results of comparison by the phase comparator 13, calculates the times required for the fundamental and harmonic light beams to propagate from the reference point to the target point. The light receiving/computing unit 2 also comprises a meteorological observing instrument 14 that measures necessary meteorological conditions along the optical path of interest. Based on the measured conditions, refractivities $N_1$ and $N_2$ of the path are determined as:

$$N_1=\alpha_1\cdot\rho_s+\beta_1\cdot\rho_w$$

$$N_2=\alpha_2\cdot\rho_s+\beta_2\cdot\rho_w$$

where $\rho_s$ and $\rho_w$ are densities of dry air and water vapor in the path, respectively, and the computing unit 15 calculates the optical path length D using the following formula:

$$D=[t_1+\{(\alpha_1+\beta_1\cdot\rho_w/\rho_s)\cdot(t_2-t_1)\}/\{(\alpha_1+\beta_1\cdot\rho_w/\rho_s)-(\alpha_2+\beta_2\cdot\rho_w/\rho_s)\}]\cdot C$$

where C is the speed of light in vacuum. The light receiving/computing unit 2 further comprises a display unit 16 that displays the results of calculation.

It is noted that the above equation of D has been established based on the fact that under ordinary meteorological conditions the following relationships hold:

$$\alpha_1 >> \beta_1 \cdot (\rho_w/\rho_s)$$

$$\alpha_2 >> \beta_2 \cdot (\rho_w/\rho_s).$$

The master oscillator 3 is composed of a quartz oscillator 17 and a synchronizing signal generator 18 that generates the synchronizing signal to be supplied to both the light transmitter 1 and the light receiving/computing unit 2.

The reflector 4 is composed of a plurality of corner-cube prisms 19.

The light-transmitting telescope 9 and the light-receiving telescope 10 are mounted either coaxially or on the same fixture.

In order to measure the optical path length of 100 km with an accuracy to $\pm 0.5 \times 10^{-6}$ in the embodiment under consideration using two light beams having wavelengths 1064 nm and 532 nm, the temperature, atmospheric pressure and relative humidity of the optical path, and the propagation times of the respective light beams must be measured with accuracies of $\pm 7°$ C., $\pm 400$ mb, $\pm 22\%$ and $\pm 8$ ps, respectively.

In the conventional single-wavelength method, on the other hand, the accuracies of measurements that are required to perform a similar distance measurement are $\pm 0.5°$ C., $\pm 1.8$ mb, $\pm 55\%$ and $\pm 166$ ps, respectively.

Obviously, the accuracies required for the measurement of temperature and atmospheric pressure in accordance with the present invention are more practicable than in the prior art. Since an error in temperature measurements can always be the greatest cause of an erroneous distance measurement, it is particularly beneficial to the object of the present invention that temperature measurements may be carried out with a lower accuracy. On the other hand, the relative humidity and propagation times need to be measured with better accuracies in the present invention, but the required values can reasonably be attained by the state of the art.

The present invention is in no way limited to the method and apparatus illustrated above which use a fundamental wave emitted from a YAG laser and a harmonic wave thereof. Similar effects, i.e., reduction in the accuracies required for temperature and atmospheric pressure measurements, can also be realized by using a He-Ne laser and a He-Cd laser that respectively operate at wavelengths 633 nm and 442 nm. Stated more specifically, the accuracies required for measuring the temperature, atmospheric pressure and relative humidity of the optical path, and the propagation times, when the optical path length of 100 km is to be measured by a dual-wavelength method using those two light beams, are $\pm 7°$ C., $\pm 427$ mb, $\pm 22\%$ and $\pm 8$ ps, respectively.

The evaluations described above were made with reference to James C. Owens, "Optical Refractive Index of Air: Dependence on Pressure, Temperature and composition", Applied Optics, Vol. 6, No. 1, pp. 51-59, 1967.

It is noted that in a pulsed method, time values directly measured are used as the propagation times $t_1$ and $t_2$. On the other hand, it the modulation method as described in the above embodiment, lengths corresponding to measured phase values of modulated light beams are divided by the speed of light in vacuum to obtain the propagation times.

Although the above description is devoted to the case using light beams, the present invention is not limited to such a case. Microwaves may be employed instead of the light beams.

As described on the foregoing pages, the present invention provides a method and an apparatus that facilitate a distance measurement with a higher accuracy than has been possible with the prior art despite the fact that the accuracies of meteorological measurements need not be as high as in the latter case.

What is claimed is:

1. A method for measuring a length of a path between a reference point and a target point using two electromagnetic waves having different wavelengths, comprising the steps of:
    measuring respective times $t_1$ and $t_2$ required for a first electromagnetic wave and a second electromagnetic wave to propagate from the reference point to the target point;
    measuring meteorological conditions along the path including a temperature, an atmospheric pressure and a relative humidity;
    determining respective refractivities $N_1$ and $N_2$ of the path for the first and second electromagnetic waves as:

$$N_1 = \alpha_1 \cdot \rho_s + \beta_1 \cdot \rho_w$$

$$N_2 = \alpha_2 \cdot \rho_s + \beta_1 \cdot \rho_w$$

where $\rho_s$ and $\rho_w$ are densities of dry air and water vapor in the path, respectively, based on the measured meteorological conditions and where $\alpha_1$, $\alpha_2$, $\beta_1$ and $\beta_2$ are wavelength-dependent coefficients; and
    calculating the length of the path using a formula of:

$$D = [t_1 + \{(\alpha_1 + \beta_1 \cdot \rho_w/\rho_s) \cdot (t_2 - t_1)\}/\{(\alpha_1 + \beta_1 \cdot \rho_w/\rho_s) - (\alpha_2 + \beta_2 \cdot \rho_w/\rho_s)\}] \cdot C$$

where C is a speed of an electromagnetic wave in vacuum, or using an approximated expansion of the formula.

2. An apparatus for measuring a length of a path between a reference point and a target pint using two electromagnetic waves having different wavelengths, comprising:
    means for measuring respective time $t_1$ and $t_2$ required for a first electromagnetic wave and a second electromagnetic wave to propagate from the reference point to the target point;
    means for measuring meteorological conditions along the path including a temperature, an atmospheric pressure and a relative humidity; and
    means for determining respective refractivities $N_1$ and $N_2$ of the path for the first and second electromagnetic waves as:

$$N_1 = \alpha_1 \cdot \rho_s + \beta_1 \cdot \rho_w$$

$$N_2 = \alpha_2 \cdot \rho_s + \beta_1 \cdot \rho_w$$

where $\rho_s$ and $\rho_w$ are densities of dry air and water vapor int he path, respectively, based on the measured meteorological conditions and where $\alpha_1$, $\alpha_2$, $\beta_1$ and $\beta_2$ are wavelength-dependent coefficients; and for calculating the length of the path using a formula of:

$$D = [t_1 + \{(\alpha_1 + \beta_1 \cdot \rho_w/\rho_s) \cdot (t_2 - t_1)\}/\{(\alpha_1 + \beta_1 \cdot \rho_w/\rho_s) - (\alpha_2 + \beta_2 \cdot \rho_w/\rho_s)\}] \cdot C$$

where C is a speed of an electromagnetic wave in vacuum, or using an approximated expansion of the formula.

3. The apparatus according to claim 2, wherein the time measuring means comprises:
    transmitting means at the reference point for transmitting said first and second electromagnetic waves to the target;
    reflecting means at the target point for reflecting said first and second electromagnetic waves back to the reference point;
    detecting means at the reference pint for detecting said reflected first and second electromagnetic waves to produce corresponding said first and second detection electric signals;
    means for obtaining respective first and second phase differences of said first and second detection electric signals from a synchronizing signal;
    means for calculating the times $t_1$ and $t_2$ based on the obtained first and second phase differences; and
    means for providing the synchronizing signal to the transmitting means and the obtaining means.

* * * * *

UNITED STATES PATENT AND TRADEMARK OFFICE
CERTIFICATE OF CORRECTION

PATENT NO. : 5,044,744

DATED : September 03, 1991

INVENTOR(S) : Ichizo Ogawa et al.

It is certified that error appears in the above-identified patent and that said Letters Patent is hereby corrected as shown below:

Claim 1, column 5, line 57, change "$N_2 = \alpha_2 \cdot \rho_S + \beta_1 \cdot \rho_W$" to --$N_2 = \alpha_2 \cdot \rho_S + \beta_2 \cdot \rho_W$--.

Claim 2, column 6, line 12, change "pint" to --point--.

Claim 2, column 6, line 28, change "$N_2 = \alpha_2 \cdot \rho_S + \beta_1 \cdot \rho_W$" to --$N_2 = \alpha_2 \cdot \rho_S + \beta_2 \cdot \rho_W$--.

Claim 2, column 6, line 31, change "int he" to --in the--.

Claim 3, column 6, line 50, change "pint" to --point--.

Signed and Sealed this

Sixth Day of April, 1993

*Attest:*

STEPHEN G. KUNIN

*Attesting Officer*    *Acting Commissioner of Patents and Trademarks*